United States Patent
Silbernagel et al.

(10) Patent No.: US 7,395,648 B1
(45) Date of Patent: Jul. 8, 2008

(54) HEIGHT OF CUT ADJUSTMENT SYSTEM FOR REEL MOWER

(75) Inventors: Carl Steven Silbernagel, Fort Mill, SC (US); David Lawrence Phillips, Willow Springs, NC (US); Truluck Tillman Ammons, III, Clover, SC (US); Richard David Thier, Juneau, WI (US); Kenneth Edward Hunt, Rock Hill, SC (US); Ronald Lee Reichen, Raleigh, NC (US); Brent Gordon Rinhoim, Fuquay Varina, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/675,666

(22) Filed: Feb. 16, 2007

(51) Int. Cl.
*A01D 34/00* (2006.01)
(52) U.S. Cl. ...................................... 56/17.2
(58) Field of Classification Search ................. 56/17.2, 56/17.1, 15.2, 7, 249, 249.5, DIG. 10
See application file for complete search history.

(56) References Cited

U.S. PATENT DOCUMENTS

| | | | | |
|---|---|---|---|---|
| 2,924,055 A | * | 2/1960 | Clemson | 56/11.5 |
| 3,106,813 A | * | 10/1963 | Strasel | 56/249 |
| 3,918,239 A | * | 11/1975 | Aldred et al. | 56/7 |
| 4,021,996 A | * | 5/1977 | Bartlett et al. | 56/7 |
| 4,335,569 A | | 6/1982 | Keeney et al. | |
| 4,479,346 A | | 10/1984 | Chandler | |
| 4,606,178 A | | 8/1986 | Saiia | |
| 4,644,737 A | * | 2/1987 | Arnold | 56/249 |
| 4,663,924 A | | 5/1987 | Saiia | |
| 4,878,340 A | * | 11/1989 | Roy et al. | 56/249 |
| 5,228,277 A | * | 7/1993 | Smith et al. | 56/16.9 |
| 5,600,942 A | | 2/1997 | Strosser | |
| 5,732,538 A | * | 3/1998 | Thorman et al. | 56/249 |
| 5,865,016 A | * | 2/1999 | Toman | 56/7 |
| 5,950,409 A | * | 9/1999 | Davies | 56/249 |
| 5,970,690 A | * | 10/1999 | Toman | 56/7 |
| 6,237,313 B1 | * | 5/2001 | Leden | 56/199 |
| 6,651,415 B2 | * | 11/2003 | Burke | 56/17.2 |
| 6,732,500 B1 | * | 5/2004 | Myers | 56/17.2 |
| 7,121,073 B2 | | 10/2006 | Schmidt et al. | |
| 2003/0140611 A1 | * | 7/2003 | Burke | 56/17.2 |
| 2003/0145570 A1 | * | 8/2003 | Berndt et al. | 56/6 |
| 2004/0216438 A1 | | 11/2004 | Schmidt et al. | |
| 2004/0216439 A1 | | 11/2004 | Poulson et al. | |

* cited by examiner

*Primary Examiner*—Árpád F Kovács

(57) ABSTRACT

A height of cut adjustment system for a reel type grass cutting unit includes adjustment screw mechanisms mounted at each corner of the cutting unit. Linkages between the adjustment screw mechanisms permit driving all of the adjustment screw mechanisms synchronously from a single adjustment point to change the cutting height. The linkages may be worm gear drives or other mechanical linkages.

20 Claims, 3 Drawing Sheets

HEIGHT OF CUT ADJUSTMENT SYSTEM FOR REEL MOWER

FIELD OF THE INVENTION

This invention relates generally to a height of cut adjustment system for a reel type grass cutting unit.

BACKGROUND OF THE INVENTION

Reel type grass cutting units typically used on golf courses and athletic fields are designed so the height at which the grass is cut can be adjusted to various levels as desired. This is an important adjustment because the appearance and health of the turf, and the quality of the athletic activity may be affected by the cut height. Throughout the growing season, the cut height may need to be changed to suit the growing conditions. Additionally, the cut height may need to be changed for different areas. On a golf course, for example, areas such as fairways are usually cut at different heights than roughs or approaches.

On a manually adjusted reel type grass cutting unit, the height of cut adjustment is labor intensive, time consuming, and requires a high level of skill. Turf managers may not change the cut height as frequently as may be needed because of the time and work involved in the adjustment process. Many facilities will have multiple mowers, each dedicated to a specific cut height, instead of re-adjusting the height of cut of a machine.

A self-adjusting reel type grass cutting unit has been developed that sets the cut height automatically when commanded through a user interface. This adjustment system has two separate frameworks: the cutting unit frame and the ground contacting frame. A pair of adjusting screws actuated by dc electric motors may raise and lower the cutting unit frame with respect to the ground contacting frame. A four bar linkage on each end of the cutting unit frame sets the attitude of the cutting unit frame and keeps the cutting unit frame approximately parallel with the ground as the cut height is adjusted. A self adjusting reel is shown in U.S. Pat. No. 7,114,318 assigned to Deere & Company of Moline, Ill.

The self adjusting reel described above has many advantages over manually adjusting the height of cut, including savings in time, skill and effort required to make the adjustment, and high accuracy. It would be desirable to further reduce the work required to set or change the height of cut of a reel type grass cutting unit.

SUMMARY OF THE INVENTION

A height of cut adjustment system for a reel type grass cutting unit includes independent adjustment mechanisms mounted to each corner of a frame of the cutting unit. Each independent adjustment mechanism operates to raise and lower a vertical post supporting a corner of the cutting unit. Linkages between the independent adjustment mechanisms allow the posts to be raised or lowered synchronously to set the cutting height. The height of cut can be set or changed from a single adjustment point.

DESCRIPTION OF A PREFERRED EMBODIMENT

Figure 1:
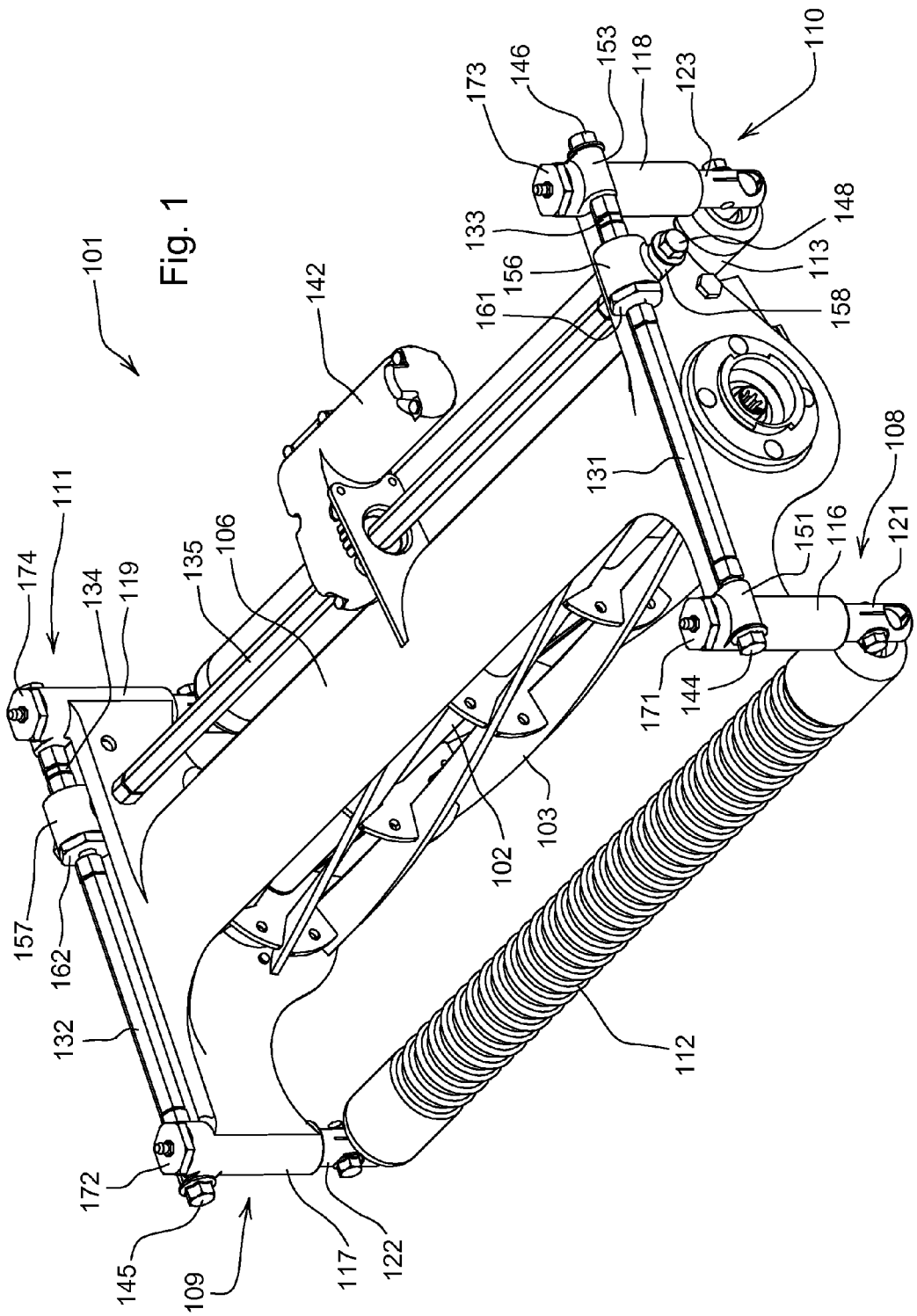
FIG. 1 is a front perspective view of a reel type grass cutting unit having a height of cut adjustment system according to a first embodiment.
Figure 2:
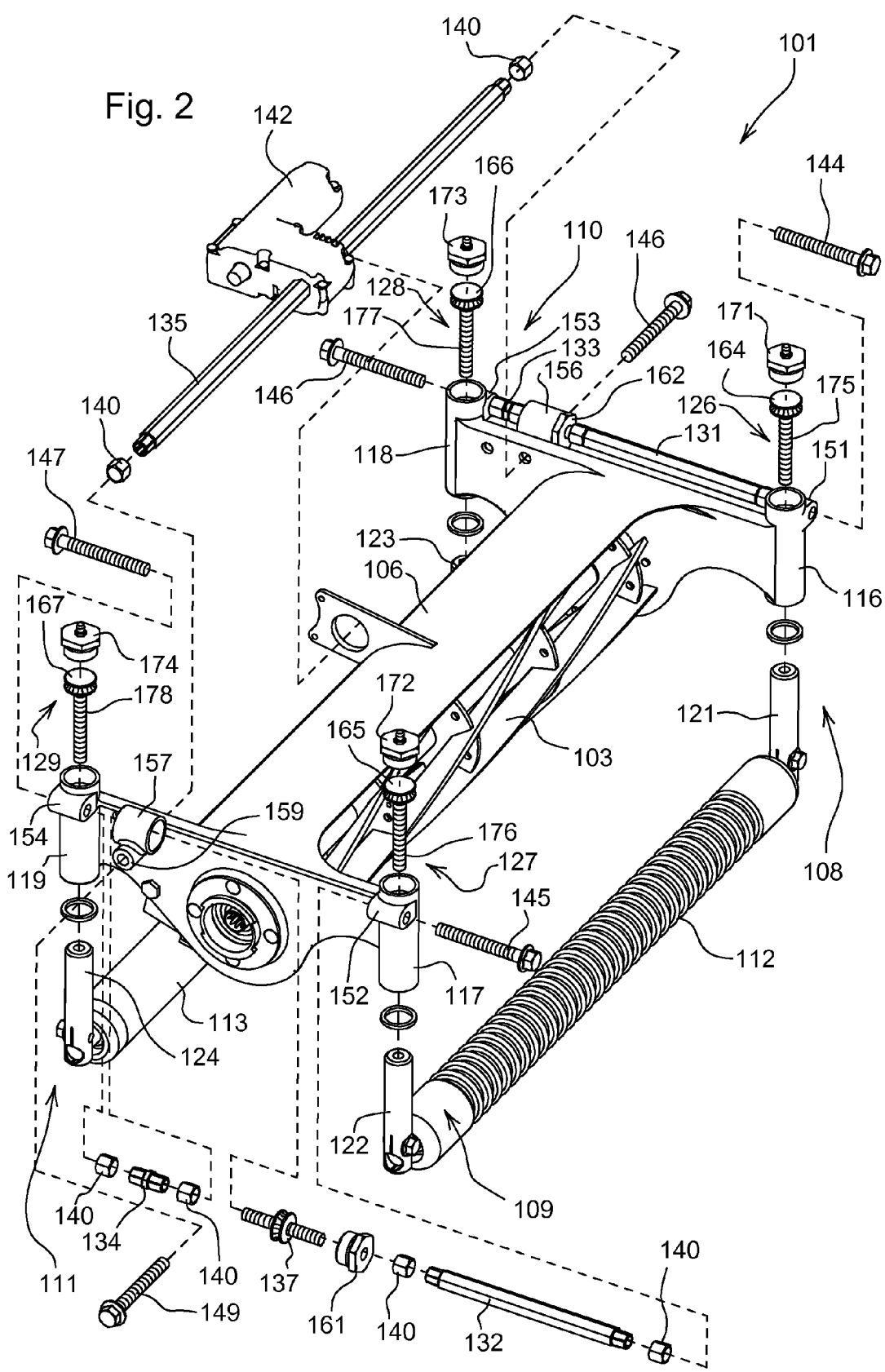
FIG. 2 is a partially exploded perspective view of a reel type grass cutting unit having a height of cut adjustment system according to a first embodiment.
Figure 3:
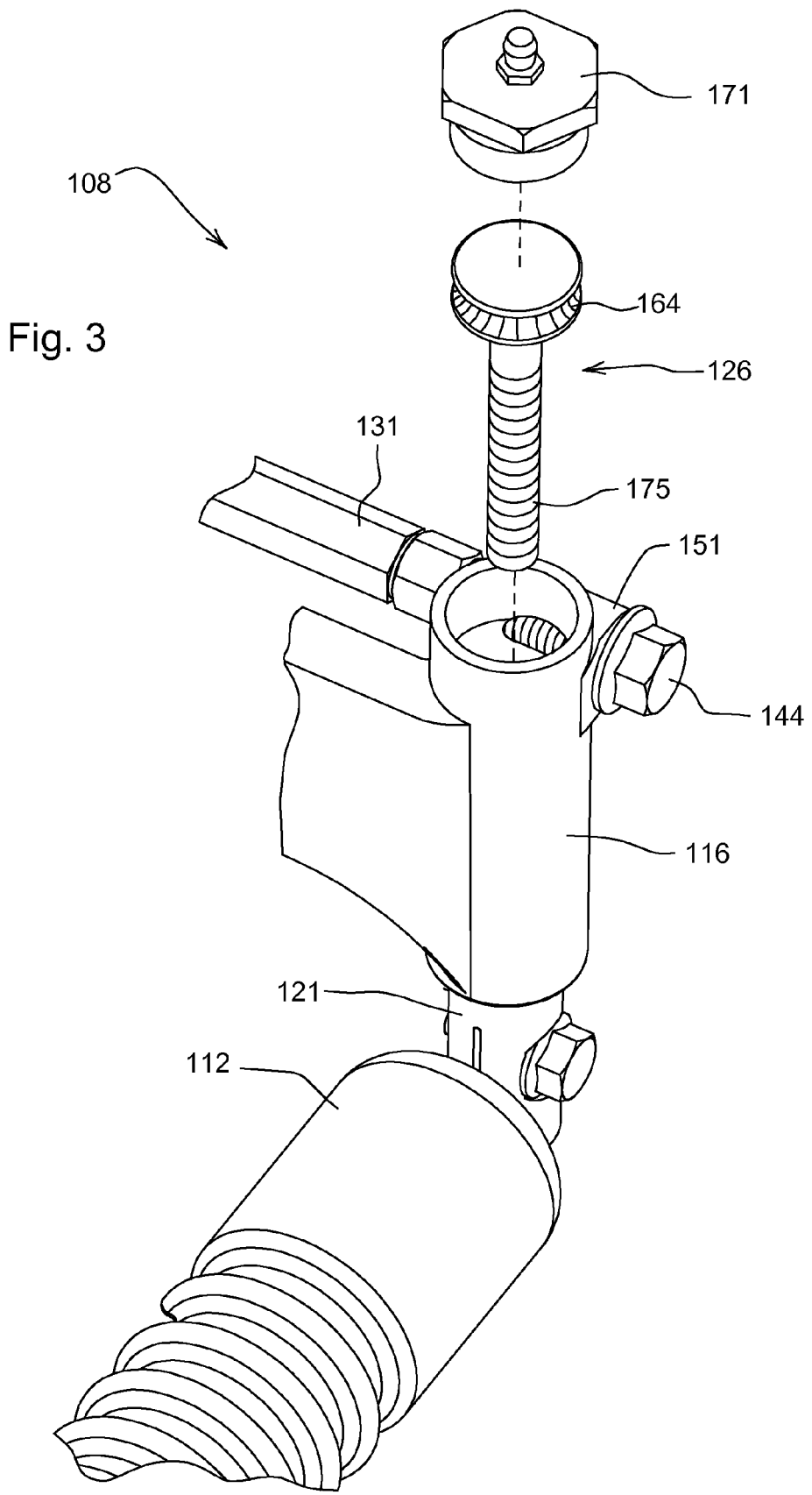
FIG. 3 is a partially exploded perspective view of an adjustment screw mechanism of the height of cut adjustment system according to a first embodiment.

FIGS. 1-3 show a height of cut adjustment system 101 for a reel type grass cutting unit according to a first embodiment of the invention. The reel type grass cutting unit has a horizontal shaft 102 that rotates to turn cutting reel 103, to cut grass between the cutting reel and bedknife 104. Motor 105 may be used to rotate shaft 102, and may be electric or hydraulic.

In one embodiment, height of cut adjustment system 101 includes four independent adjustment mechanisms, each of which may be rigidly attached to and support a corner of cutting unit frame 106. The independent adjustment mechanisms may be adjustment screw mechanisms 108-11. Front ground roller 112 may be attached to the lower portion of a pair of front adjustment screw mechanisms 108-09, and rear ground roller 113 may be attached to the lower portion of a pair of rear adjustment screw mechanisms 110-11. The opposing ends of the front and rear ground rollers may be rotatably mounted to the lower portions of the adjustment screw mechanisms so that the ground rollers may rotate as they roll across the turf and support the cutting unit at a desired cutting height.

In one embodiment, each adjustment screw mechanism 108-11 can change the position of a vertical post 121-24 mounted to the end of a ground roller. Each post 121-24 can move vertically up or down within a sleeve 116-19 rigidly mounted to a corner of the cutting unit frame.

In one embodiment, each post 121-24 can move vertically up or down within a sleeve 116-19 by turning an adjustment screw 126-29. Each adjustment screw 126-29 includes externally threaded screw shaft 175-78 and worm gear 164-67. Externally threaded screw shaft 175-78 engages internal threads in an axial bore through post 121-24. Worm gears 164-67, at the top end of adjustment screws 126-29, are concentric to the screw shafts. Each sleeve may be covered by a cap 171-74.

In one embodiment, each adjustment screw 126-29 may be turned by rotating worm shaft 144-47 that engages worm gear 164-67. Each worm shaft 144-47 is perpendicular to worm gear 164-67. Each worm shaft 144-47 may extend through a case 151-54 open to the side of a sleeve 116-19, so that it can engage each worm gear 164-67. Additionally, each worm shaft 144-47 may have a hex head extending out from the end of the case so that it can be gripped and turned with a wrench or power drill socket, or the worm shaft may be turned by other devices such as those described in more detail below. When viewed from above, each worm shaft 144-47 may be approximately 25 mm to the side of the worm gear axis.

In one embodiment, worm shafts 144, 146 on the left side of the cutting unit are concentric. The concentricity of worm shafts 144, 146 allow the two left adjustment screw mechanisms to be driven synchronously by connecting the worm shafts together with drive shafts 131, 133. Similarly, worm shafts 145, 147 on the right side of the cutting unit are concentric, and are connected together with drive shafts 132, 134 to allow driving the two right adjustment screw mechanisms synchronously. Shaft connectors 140 may slide over the ends of the drive shafts and worm shafts to connect them together. The shaft connectors may be removed to disconnect the shafts as necessary, so that an operator can manually preset parallelism and/or attitude of the cutting units.

In one embodiment, the adjustment screw mechanisms on the left side and right side of the cutting unit may be linked together so that all four mechanisms can be driven synchronously, to change the cut height, from a single adjustment point. For example, the mechanical linkage may be drive shaft 135 that connects between the left and right adjustment screw mechanisms. Worm shafts 148-49 may be attached to the opposing ends of drive shaft 135 using shaft connectors. Each worm shaft 148-49 may extend through a case 158-59. Each case 158-59 may be open to the side of sleeve 156-57 so that worm shaft 148-49 can engage screw gear 137-38. Screw gears 137-38 extend through sleeves 156-57 mounted to frame 106. Screw gear 137 may be connected between drive shafts 132 and 134 using shaft connectors and spacer 161. A screw gear (not shown) also may be connected between drive shafts 131 and 133 using shaft connectors and spacer 162.

Instead of drive shafts linking the adjustment screw mechanisms, the mechanical linkage may be a synchronous belt or chain drive that links the mechanisms together. Driving all four adjustment screw mechanisms synchronously allows an operator to adjust the entire cut height at one adjustment point. Alternatively, each pair of adjustment screw mechanisms (e.g., the front pair of mechanisms, and the rear pair of mechanisms) may be linked together so that each pair may be driven synchronously from one adjustment point, and the cut height may be changed from only two adjustment points.

In one embodiment, the adjustment point may be a hex head on the end of each worm shaft that may be driven by a hand wrench in a manual adjustment system. Alternatively, the adjustment point may be a hex head on the end of the worm shaft that may be driven using a portable power source such as an electric drill unattached from the cutting unit. Alternatively, as described above, the adjustment point may be driven by a power source attached to the frame of the reel cutting unit, such as dedicated electric motor 142 shown in FIGS. 1-3. The dedicated electric motor may be a DC motor mounted to cutting unit frame 106 so that it may turn drive shaft 135 and drive all four adjustment screw mechanisms synchronously. Additionally, the electric motor may be connected to a control computer and user interface as part of a self adjusting reel system.

In one embodiment, a mechanical counter may be mounted to one of the drive shafts. The mechanical counter may increment with each rotation of the drive shaft, and indicate actual cut height. For example, if adjustment screws 126-29 have a pitch of 20 threads per inch, each rotation of the adjustment screw will change the cut height 0.05 inch. If the worm gear drive ratio is 50:1, each rotation of a drive shaft 131-35 will turn the adjustment screw $1/50^{th}$ of a turn. As a result, each turn of the drive shaft will change the cut height 0.001 inch. The mechanical counter may indicate the cut height to 0.001 inch resolution.

In one embodiment, the drive ratio of the linkage that connects the drive shafts may be arranged such that the attitude of the cutting mechanism increases with increasing cutting height. For example, if the front and rear drive shafts are driven at the same rate, the front of the cutting unit may raise as the adjusting screws turn at the same rate.

The height of cut adjustment system of the present invention provides adjustment flexibility because the ground rollers can be adjusted to be parallel with each other and the bedknife. A pair of adjustment screws, or all four adjustment screws, may be linked together synchronously so that the cut height may be set or changed at one adjustment point. This reduces the work required to set or adjust the height of cut. Optionally, each adjustment point may have a mechanical and/or digital display indicating the cut height. The adjustment point may be powered by a portable electric tool, so that the adjustment may be performed quickly. Alternatively, the adjustment point may be powered by a dedicated actuator as part of a self adjusting reel system.

Having described a preferred embodiment, it will become apparent that various modifications can be made without departing from the scope of the invention as defined in the accompanying claims.

The invention claimed is:

1. A height of cut adjustment system for a reel type grass cutting unit, comprising:
   a plurality of adjustment screw mechanisms between the cutting unit and ground rollers supporting the cutting unit at a cutting height; and
   a mechanical linkage between the adjustment screw mechanisms to permit driving all of the plurality of adjustment screw mechanisms synchronously from a single adjustment point to change the cutting height.

2. The height of cut adjustment system of claim 1 wherein the mechanical linkage is a drive shaft.

3. The height of cut adjustment system of claim 2 further comprising a worm gear drive between the drive shaft and each adjustment screw mechanism.

4. The height of cut adjustment system of claim 1 wherein the mechanical linkage is a synchronous belt.

5. The height of cut adjustment system of claim 1 wherein the mechanical linkage is a chain drive.

6. The height of cut adjustment system of claim 1 wherein the single adjustment point is a hex head that may be driven by a hand wrench.

7. The height of cut adjustment system of claim 1 further comprising a dedicated electric motor mounted to the cutting unit to drive the plurality of adjustment screw mechanisms from the single adjustment point.

8. A height of cut adjustment system for a reel type grass cutting unit, comprising:
   an adjustment screw mechanism mounted at each corner of the cutting unit;
   each adjustment screw mechanism having a vertical post attached at its lower end to a ground roller, and a worm gear drive connected to each vertical post; and
   a linkage between each worm gear drive so that the worm gear drives can turn synchronously.

9. The height of cut adjustment system of claim 8 further comprising an electric motor mounted to the cutting unit to turn the worm gear drives synchronously.

10. The height of cut adjustment system of claim 8 wherein the linkage is at least one drive shaft between a pair of adjustment screw mechanisms.

11. The height of cut adjustment system of claim 10 wherein the at least one drive shaft is horizontally aligned.

12. The height of cut adjustment system of claim 8 further comprising at least one adjustment point from which all of the worm gear drives may be turned synchronously.

13. A height of cut adjustment system for a reel type grass cutting unit, comprising:
   an independent adjustment mechanism mounted to each corner of a frame of the cutting unit;
   each independent adjustment mechanism operating to raise and lower a vertical post supporting a corner of the cutting unit;
   an electric motor mounted to the frame of the cutting unit; and
   linkages between the electric motor and each independent adjustment mechanism to raise and lower the posts synchronously to set a cutting height of the cutting unit.

14. The height of cut adjustment system of claim 13 wherein each independent adjustment mechanism is an adjustment screw mechanism.

15. The height of cut adjustment system of claim 13 wherein the linkages are drive shafts and worm gear drives.

16. The height of cut adjustment system of claim 15 wherein at least two of the worm gear drives are concentric.

17. The height of cut adjustment system of claim 13 further comprising a ground roller rotatably mounted to each two vertical posts.

18. The height of cut adjustment system of claim 13 wherein the linkages are synchronous belts.

19. The height of cut adjustment system of claim 13 wherein the linkages are chain drives.

20. The height of cut adjustment system of claim 13 further comprising a single adjustment point drivable by a hand wrench.

* * * * *

UNITED STATES PATENT AND TRADEMARK OFFICE
CERTIFICATE OF CORRECTION

| | |
|---|---|
| PATENT NO. | : 7,395,648 B1 |
| APPLICATION NO. | : 11/675666 |
| DATED | : July 8, 2008 |
| INVENTOR(S) | : Carl Steven Silbernagel et al. |

It is certified that error appears in the above-identified patent and that said Letters Patent is hereby corrected as shown below:

Title Page; item (75);
Inventor Brent Gordon Rinholm's last name is mis-spelled as "Rinhoim." His last name should be spelled "Rinholm."

Signed and Sealed this

Ninth Day of December, 2008

JON W. DUDAS
*Director of the United States Patent and Trademark Office*